(12) United States Patent
Pfiffer

(10) Patent No.: US 7,656,464 B2
(45) Date of Patent: Feb. 2, 2010

(54) REMOTE CONTROL UNIT CODE LEARNING TELEVISION SET

(75) Inventor: Andrew K. Pfiffer, Aloha, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 631 days.

(21) Appl. No.: 11/266,894

(22) Filed: Nov. 3, 2005

(65) Prior Publication Data

US 2007/0097273 A1     May 3, 2007

(51) Int. Cl.
*H04N 5/44*     (2006.01)
(52) U.S. Cl. ........................................ 348/734
(58) Field of Classification Search ............. 348/734, 348/725; 340/825.69, 825.72; 341/176
See application file for complete search history.

(56) References Cited

U.S. PATENT DOCUMENTS

| | | | | |
|---|---|---|---|---|
| 5,365,282 A | * | 11/1994 | Levine | ........................ 348/734 |
| 6,239,718 B1 | * | 5/2001 | Hoyt et al. | ............. 340/825.22 |
| 6,407,779 B1 | * | 6/2002 | Herz | .......................... 348/734 |
| 7,242,439 B2 | * | 7/2007 | Mizushima et al. | ......... 348/734 |
| 2004/0212743 A1 | * | 10/2004 | Yamazaki | .................... 348/734 |
| 2005/0060750 A1 | * | 3/2005 | Oka et al. | ...................... 725/80 |
| 2006/0262231 A1 | * | 11/2006 | Chang | ......................... 348/734 |

* cited by examiner

*Primary Examiner*—Paulos M Natnael

(57) ABSTRACT

A television set which learns to work with a remote control unit not specifically designed to operate that television set. The television set enters a learning mode in response to the user pressing a "Learn Remote" button or menu item, or in response to receiving an unknown remote control signal value, and gives the user a series of prompts for the user to press specified buttons on the remote control unit. As the user presses the buttons, the television set associates the received data values with the prompted button/functionality, to construct the remote code data set of the remote control unit. The television set may retrieve the remote code data set from an external source such as a website. After learning the remote code data set, the television set is able to be controlled by the remote control unit as though it were factory original.

12 Claims, 2 Drawing Sheets

REMOTE CONTROL UNIT CODE LEARNING TELEVISION SET

BACKGROUND OF THE INVENTION

1. Technical Field of the Invention

This invention relates generally to television systems with remote control units, and more specifically to adaptation of a television set to operate with a remote control unit.

2. Background Art

Virtually all television sets are now supplied with wireless remote control units whereby a user may operate the various controls of the television set without being in immediate proximity to the television set. These remote control units communicate via a one-way wireless link to their television sets. The link is one-way in that the remote control unit contains only a transmitter and not a receiver. The wireless link may communicate via e.g. radio frequency (RF), infrared (IR), or other means.

A few "universal" remote control units have been known to be equipped with a transmitter for sending signals to the television, as well as a receiver for receiving signals from another remote control. This enables the universal remote to learn how to emulate the other remote control unit, by associating particular buttons with digital values transmitted by the other remote when corresponding buttons are pressed by the user. Thereafter, the user can use the universal remote to control the appliance (DVD player, stereo, what have you) which came with the other remote, which can now be put in a drawer and forgotten.

Some universal remotes are pre-programmed to emulate any of a large number of different remote control units, typically the most popular models from the major manufacturers. These units typically come with a user's manual instructing the user to select a code set identifier from a list, according to the brand of television to be associated with the universal remote. Typically, the codes are sorted in order of greatest likelihood, according to the sales volumes of the respective models. The user presses some predetermined key sequence, setting the remote control unit into a programming mode, then selects the code set identifier from the list and enters it via the numerical keys of the remote control unit. The user then presses one or more television control buttons on the remote control unit, such as the power button, the channel up and down buttons, and so forth, attempting to ascertain whether the selected code set is correct for that particular model of television set. If not, he repeats the process until he finds the correct code set or he exhausts the possibilities. Often, especially with off-brand television sets or with newly-introduced models, the universal remote control unit is simply not pre-programmed with the correct code set, and cannot be used to operate the television set.

What is desirable, then, is an improved system and method for associating a remote control unit with a television set.

DETAILED DESCRIPTION

The invention will be understood more fully from the detailed description given below and from the accompanying drawings of embodiments of the invention which, however, should not be taken to limit the invention to the specific embodiments described, but are for explanation and understanding only.

Figure 1:
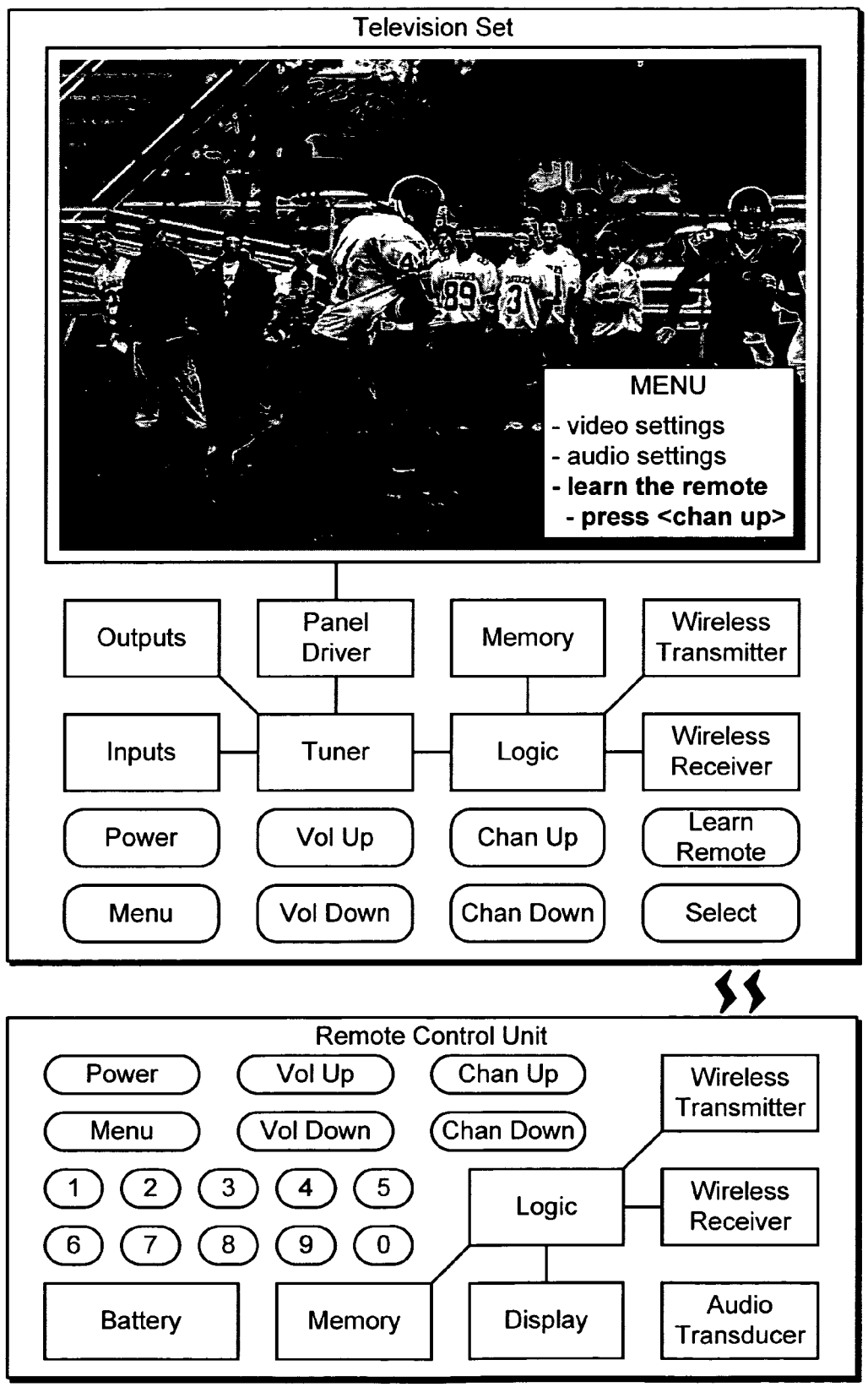
FIG. 1 shows a television system according to one embodiment of this invention, including a television set adapted to learn the control signal data set of a remote control unit not necessarily constructed for use with that television set.

FIG. 1 illustrates a television system including a television set and a remote control unit. The television set includes one or more inputs for receiving signals from external sources, such as a DVD player, a VCR, a cable or satellite television system, a terrestrial reception antenna, the internet, a telephone network, and so forth. The television set includes one or more outputs for sending signals to external destinations, such as a DVD recorder, a VCR, a cable or satellite television system, the internet, a telephone network, an audio amplifier, audio loudspeakers, and so forth.

The television set includes a display panel illustrated as presenting an image from a football game broadcast. The television set further includes at least one tuner for receiving and decoding a broadcast received at one of the inputs, and a panel driver for generating appropriate signals for presenting that broadcast on the display panel. The television set includes logic, such as a programmable microprocessor or digital signal processor, coupled to memory for storing instructions, data, frame buffers, and the like. The television set typically also includes a plurality of buttons via which the user may control operation of the television set, such as a power button, volume up and down buttons, channel up and down buttons, a menu button and a select button for performing on-screen menu functions. The television set is equipped with a wireless receiver for receiving signals from the remote control unit.

The remote control unit includes logic such as a microprocessor, an ASIC, or the like for performing logic and control functions, and memory for holding instructions and data for those functions. Some remote control units include a small display for presenting data to the user. A battery supplies electric power for the remote control unit. The remote control unit further includes a plurality of buttons which the user can press to send predetermined signals to the television set via a wireless transmitter of the remote control unit. The memory holds the values of the signals to be sent. For example, when the user presses the channel up button, the logic may retrieve the value 0x551F from the memory and send that value to the television set via the wireless communication link between the remote control unit's wireless transmitter and the television set's wireless receiver. The collection of data values associated with the various buttons, to be sent when the respective buttons are pressed, are referred to as the remote code data set of the remote control unit.

The television set includes a means for learning the remote code data set of the remote control unit. Rather than the user having to adapt the (universal) remote control unit to work with this particular television set, the television set adapts itself to work with this particular remote control unit.

The means for learning includes the logic and sufficient storage in the memory to store or at least identify the remote control unit's remote code data set. It further includes some mechanism for instigating the learning process. In one embodiment, the user presses a "Learn Remote" button on the television set, or selects a "Learn Remote" item from an on-screen menu system of the television set. In other embodiments, the television set may automatically attempt to learn the data set of an unrecognized remote control unit.

In one embodiment, when the user has instigated the learning process, the television set's logic causes a series of prompts to appear on the television set's display panel, instructing the user to press a particular expected button, such as the channel up button. After each prompt, the television set waits to receive and commit to memory whatever data value the remote control unit transmits in response to that prompt. The television set may watch for duplicate data, suggesting that the user has made a mistake (because a well-designed remote control unit would not send the same signal for two different buttons). Upon detecting such an error, the television set may ask the user to repeat one or both of the suspect keys. In any case, if the user fails to respond to a prompt within some predetermined period of time, or perhaps as quickly as he responded to previous prompts, the television system may assume that the remote control unit lacks that particular button. The television system may include a variety of user interaction mechanisms, such as a key sequence whereby the user may indicate that he has made an error.

In some embodiments, while in this learning mode, the television set will not actually respond to the button presses on the remote control, other than to observe the incoming data values. In other words, if the user presses the power button on the remote control unit, the television set will not actually power itself off.

When the television set has exhausted its list of prompts, it exits the learning mode, and returns to normal operating mode, in which it will respond to remote control button presses as expected.

In some embodiments, the television set does not need to walk the user through the entire button set. Rather, the television set may, after some number of queries and responses, be able to determine which particular remote control unit is being used. This requires that the television set be provided with a list of known remote control units and their data sets, so the television set can search for a data set matching the values received so far from the remote control unit.

Figure 2:
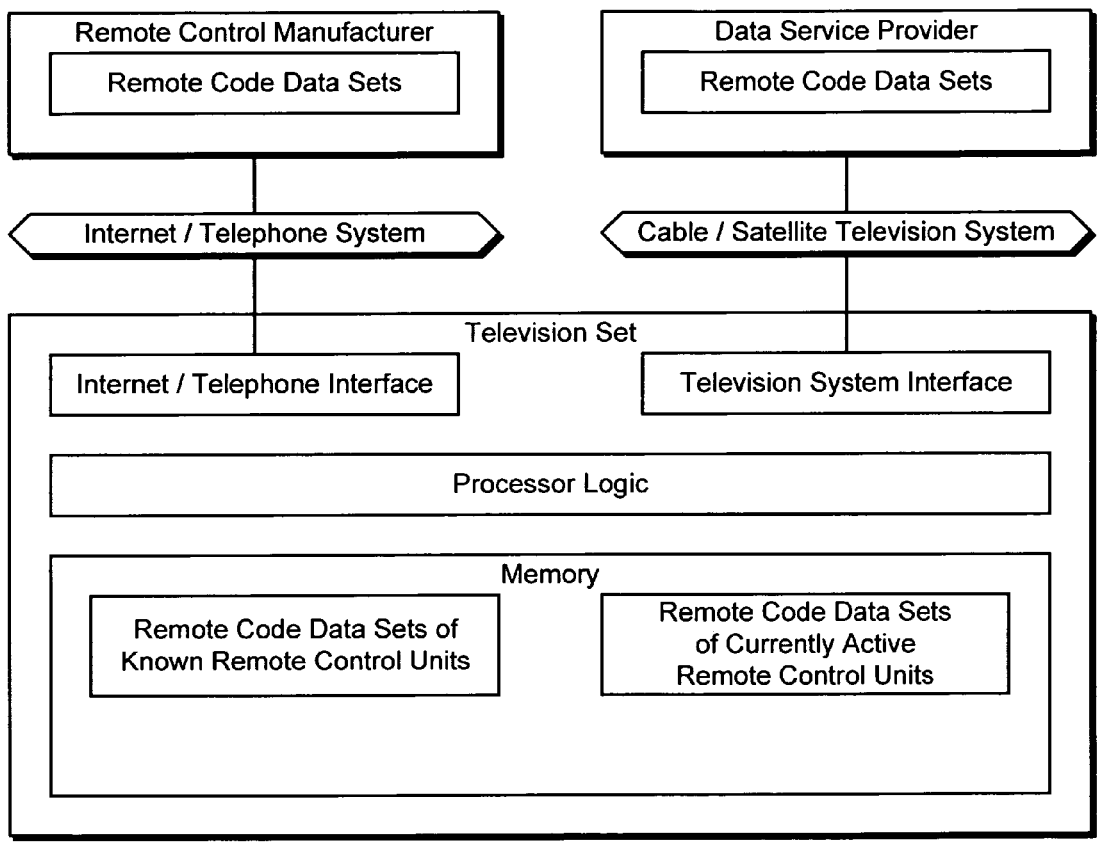
FIG. 2 shows the television system coupled to glean data set information from external sources.
Figure 2:
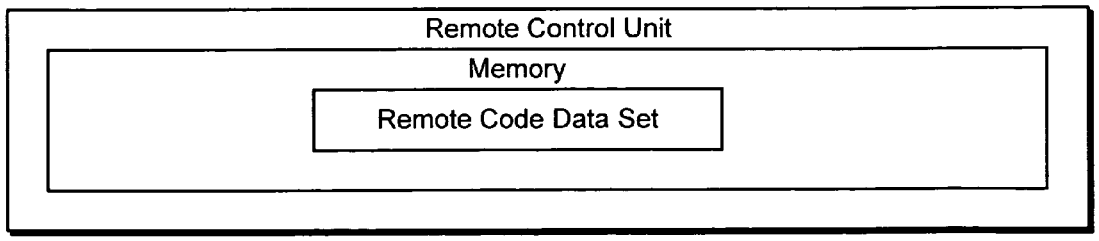

FIG. 2 illustrates the television set connected to one or more external sources for retrieving remote code data sets of one or more remote control units. The television set may connect to e.g. the website of a remote control unit manufacturer to retrieve the remote code data sets for that manufacturer's products. The television set may connect to a data service provider to retrieve the remote code data sets which the data service provider makes available. The data service provider may, for example, be an aggregating clearinghouse through which a multitude of remote control unit providers may offer their remote code data sets to the public. The television set may connect to any of these manufacturers or data service providers via, for example, the internet, the telephone network, a cable television system, a satellite television system, or what have you.

The television set may periodically query one or more data service providers and/or one or more manufacturers, to make sure that it has an up-to-date collection of all available data sets. Or, it may only query them upon encountering an unknown remote control unit.

In one embodiment, the television set determines that it has encountered a previously unknown remote control unit when it receives a remote code value that does not match any of its currently active remote control units.

In some embodiments, the television set is capable of responding to button codes from a plurality of currently active remote control units. "Currently active" means that the television set has received signals from a remote control unit, not that the remote control unit is actually sending signals at this particular moment. Often, a user may have several remote control units strewn about his coffee table, and he may grab any one of them to, for example, turn up the volume on the television set. It is not necessarily the case that the television set is only capable of remembering a single remote code value for any particular operation. The codes may be utilized in a many-to-one manner, such that a plurality of different values from a plurality of different remote control units may all cause the same behavior at the television set.

Referring again to FIG. 1, in one embodiment, the television set may also include a wireless transmitter and the remote control unit may include a wireless receiver, whereby the television set can communicate data back to the remote control unit.

This facility may be used, for example, to reprogram the remote code data set of the remote control unit, or to update the firmware of the remote control unit's processor, in response to the television set receiving such from the remote control manufacturer or a data service provider over the internet etc.

The remote control unit may further include an audio transducer or an LED for providing feedback to the user. When, in learning mode, the television set prompts the user to press a particular key, and the television set then receives a remote code value, the television set may transmit an acknowledgement signal back to the remote control, causing the remote control unit to play a sound or flash the LED, so the user knows that the television set received the signal.

This back-link communication may be used for other purposes, as well. For example, the television set's wireless receiver may be equipped to indicate to the television set's logic the strength of incoming signals received from the remote control unit. If the signals are significantly above a level necessary to maintain reliable communication, the television set may send a signal telling the remote control unit that it can lower the power of its wireless transmitter, enabling the remote control unit to conserve battery power.

CONCLUSION

The various features illustrated in the figures may be combined in many ways, and should not be interpreted as though limited to the specific embodiments in which they were explained and shown.

The user prompts may be provided as on-screen video messages, or they may be provided as audio messages, or via any other suitable mechanism.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A television system comprising:
a television set including,
    a display panel,
    a panel driver configured to provide video signals to the display panel,
    first logic configured to perform control functionalities of the television set,
    memory coupled to the first logic and configured to store a remote code data set,
    a wireless receiver coupled to the first logic configured to receive signals from a remote control unit, and
    second logic, coupled to the first logic, configured to retrieve a remote code data set from the remote control unit's remote code data set and storing it into the memory;
    the television set configured to, once the remote control unit's remote code data set has been stored into the memory, to be controlled by a user pressing buttons on the remote control unit.

2. The television system of claim 1 wherein the second logic comprises:
   a first button on the television set;
   a prompt mechanism in the television set configured to display prompts to the user in response to an indication that the first button has been pressed to press specified buttons on the remote control; and
   wherein the first logic is configured to associate signal values received in response to the prompts with particular button functionalities.

3. The television set of claim 2 wherein the prompt mechanism comprises:
   an on-screen video prompting system.

4. The television system of claim 1 wherein the second logic comprises:
   logic configured to display a menu item in an on-screen menu system of the television set;
   a prompt mechanism in the television set for prompting the user to press specified buttons on the remote control; and
   wherein the first logic is configured to associate signal values received in response to prompts with particular button functionalities.

5. The television set of claim 4 wherein the prompt mechanism comprises:
   an on-screen video prompting system.

6. The television system of claim 1 wherein the second logic comprises:
   logic configured to retrieve the remote code data set from an external source via a communication system.

7. The television system of claim 6 wherein the external source comprises:
   a website.

8. The television system of claim 7 wherein:
   the website is specific to a manufacturer of the remote control unit.

9. The television system of claim 7 wherein:
   the website is an aggregator of remote code data sets of remote control units from a plurality of manufacturers.

10. A method whereby a television set adapts itself to operate under control of a remote control unit not specifically designed to operate that television set, the method comprising:
    the television set retrieving a remote code data set of the remote control unit; and
    the television set storing the retrieved remote code data set in memory of the television set;
    the television set receiving a control data value from the remote control unit;
    the television set looking the received control data value up in the stored remote data code set to identify a functionality associated with the received control data value; and
    the television set performing the identified functionality.

11. The method of claim 10 wherein the television set retrieves the remote code data set by:
    (a) prompting a user to press a button corresponding to a functionality;
    (b) then receiving a new control data value from the remote control unit;
    (c) writing the new control data value to the memory and associating it with that functionality in the memory; and
    repeating (a) through (c) for each of a plurality of functionalities.

12. The method of claim 10 wherein prompting the user is by:
    displaying an on-screen prompt identifying the functionality.

* * * * *